(12) United States Patent
Muendel

(10) Patent No.: US 7,809,236 B2
(45) Date of Patent: Oct. 5, 2010

(54) OPTICAL FIBER HOLDER AND HEAT SINK

(75) Inventor: Martin H. Muendel, Oakland, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 205 days.

(21) Appl. No.: 12/051,189

(22) Filed: Mar. 19, 2008

(65) Prior Publication Data
US 2009/0060444 A1  Mar. 5, 2009

Related U.S. Application Data

(60) Provisional application No. 60/908,245, filed on Mar. 27, 2007.

(51) Int. Cl.
*G02B 6/00* (2006.01)
(52) U.S. Cl. ........................ 385/137; 385/136
(58) Field of Classification Search ................ 385/134, 385/136, 137
See application file for complete search history.

(56) References Cited

U.S. PATENT DOCUMENTS

| 5,359,687 | A | 10/1994 | McFarland et al. ............ 385/49 |
| 5,659,647 | A | 8/1997 | Kravitz et al. ................. 385/52 |
| 6,442,312 | B1 * | 8/2002 | Terao et al. ................... 385/37 |
| 6,738,554 | B2 | 5/2004 | Daoud et al. |
| 6,980,726 | B2 | 12/2005 | Daoud et al. |

FOREIGN PATENT DOCUMENTS

| EP | 0214701 | 3/1987 |
| EP | 0890851 | 1/1999 |

* cited by examiner

*Primary Examiner*—Mark A Robinson
*Assistant Examiner*—Michael P Mooney
(74) *Attorney, Agent, or Firm*—Matthew A. Pequignot; Pequignot + Myers LLC

(57) ABSTRACT

An optical fiber holding device is disclosed having an optical fiber held therein. The device has a base with a spiral channel in an upper surface holding and housing the optical fiber. The channel has a first location where the fiber enters leading to a plurality of turnings for holding the optical fiber wrapped therearound at another end a second location where the fiber exits the channel wherein the bend radius of the optical fiber housed within the spiral channel is at least 2 cm. The dimensions are such that housing forms a heat sink allowing heat within the fiber to dissipate within the base. The spiral channel is preferably designed to keep the fiber within the channel and to prevent it from inadvertently springing out spring tension of the bent fiber holds the fiber within the groove or channel.

21 Claims, 3 Drawing Sheets

CHANNEL FOR FIBER TO PASS
FROM ONE SIDE OF PLATE
TO OTHER

OPTICAL FIBER HOLDER AND HEAT SINK

CROSS-REFERENCE TO RELATED APPLICATIONS

The present invention claims priority from U.S. Provisional Patent Application No. 60/908,245 filed Mar. 27, 2007, entitled: "Optical Fiber Fixture" by Martin H. Muendel, which is incorporated herein by reference.

FIELD OF THE INVENTION

This invention relates generally to an optical fiber holding device and more particularly to a holding that facilitates heat sinking of excess heat within an optical fiber, into the holding device.

BACKGROUND OF THE INVENTION

Optical fiber is used as a transmission medium, both to transmit light from one point to another, as well as to modify the characteristics of light, for example as a gain medium in a fiber laser or an optical amplifier, or as a dispersion compensating medium in a telecommunications network. When an optical fiber is used to modify the characteristics of light rather than for transmission, it is often preferred that the optical fiber be contained in a relatively compact volume which will be incorporated inside an enclosed unit, typically with linear dimensions of less than 0.5 meter.

Typical fiber-lasers or amplifier fibers are formed of lengths of optical fiber between 10 millimeters and 100 meters, most commonly in the 1-30 meter range, and generally the minimum permissible bend radius of the fibers is 10-20 millimeters. Other specialty optical fibers typically fall into the same range of parameters. Depending on the application, optical fibers may release enough heat, for example over one watt, to require efficient heat removal. Furthermore, the optical fibers used in fiber lasers should preferentially be protected from movement or accidental damage during handling. Due to the fragile nature of optical fiber, there is a need to protect the fiber from external sources of stress, such as bending, pressure and strain, which can damage the fiber and/or cause degradation of a signal being transmitted via the fiber. For example, a fiber should not be bent sharply anywhere along its path. In addition to the possibility of breakage or fracture, if a fiber is bent past a critical angle, portions of transmitted light pulses will leak out, rather than being reflected within the fiber core, thereby attenuating the transmitted light pulses and degrading signal quality. Accordingly, it is necessary that a fiber be routed so that bends in the fiber are of a sufficient radius to substantially avoid occurrence of such light leakage. U.S. Pat. No. 6,980,726 in the name of Daoud et al., discloses an optical fiber bend limiter that prevents contaminates from entering an optical fiber closure.

Compact lengths of optical fiber are traditionally held in spools similar to spools of string, that is, exteriorly-wound coils around a central spool or mandrel, with multiple coils, side-by-side, thus requiring a spool with significant thickness to accommodate the multiple coils; or lengths of optical fiber can be formed into loose coils bound to themselves with tape, plastic tie wraps, or similar devices. For example, U.S. Pat. No. 6,738,554 in the name of Daoud et al., entitled Double Helical-S Fiber Tray, discloses a tray in which optical fiber is wound in an "S" configuration. In this patent the optical fiber is shown to have lengths of optical fiber resting upon other lengths of optical fiber in layers building up within the enclosure. However, these known methods and devices for accommodating optical fiber do not necessarily ensure efficient heat removal or protection from movement or accidental damage, and they are often not as compact as desired.

There is therefore a need for a compact device for holding, protecting, and heat-sinking unwanted heat within a length of optical fiber.

Heat build up and heat transfer within optical fibers becomes a particular concern in high power operation, for example at 100 W or higher. In these instances lasing within the optical fiber at elevated temperatures inherently leads to losses in efficiency. This is a particular problem with Yb-doped fibers, because the energy levels are so close together in this dopant. At elevated temperatures, the thermal population of the lower laser level is increased and the population of the upper state is decreased, leading to decreased inversion and efficiency. Hence, it is important to maintain the fiber core as close to room temperature as possible, and certainly under 70 degrees C. Another drawback to operating a fiber laser at elevated temperatures is that over time, fiber temperatures over the 70 C range can also degrade the polymer coatings on the fiber, and possibly the fiber core materials as well. In a fiber laser having hundreds of watts of output power, the fiber may be dissipating multiple watts of power per meter across a total surface area of typically only a few square centimeters per meter, so having minimal thermal resistance to a heat sink is imperative in order to keep the core temperature near room temperature. The fiber's cladding layers and polymer coatings have significant thermal resistance and can lead to a temperature rise of several degrees or tens of degrees C.

Potting compound, and even "thermally conductive" potting compound, generally has much lower thermal conductivity than a metal; thus the use of any substantial thermal thickness of potting compound can significantly increase the thermal resistance and raise the core temperature. From the standpoint of contamination and optical damage, it is also important to minimize the amount of organic material in the vicinity of the fiber and particularly the fiber tips. The presence of the fiber polymer coating is is by design present and must be contended with, but potting material will typically be a much greater volume of organic material and much less cleanly applied. In the hot operating environment at full power, the use of potting compound raises a substantial risk of contamination of the fiber end faces with volatilized organic materials. Thus potting compound is not a desired solution to the problem of excess heat within the fiber.

It is therefore an object of the invention to holding the fiber in a way that has excellent heat transfer directly into high-conductivity metal, and no added risk of contamination by organic materials.

It is an object of this invention to provide a fiber holder that will hold a length of optical fiber in a compact manner while ensuring that the bend radius of the length of optical fiber is at least a predetermined radius so as to avoid the possibility of breakage, of excess light leakage, and that will facilitate the heat sinking of heat from within the optical fiber to the holder.

SUMMARY OF THE INVENTION

In accordance with the invention there is provided an optical fiber holding device having an optical fiber held therein comprising:

base with a first spiral channel in an upper surface thereof holding and housing the optical fiber, the channel including:

first opening in the side of the base for holding the first end of the optical fiber, plurality of turnings for holding the optical fiber wrapped therearound;

center; and second opening in the center of the spiral for holding a second end of the optical fiber, wherein the bend radius of the optical fiber housed within the spiral channel is at least 2 cm.

In accordance with the invention there is provided, an optical fiber holding device comprising:

base with a first spiral channel in an upper surface thereof for receiving an optical fiber, the channel including:

first opening in the side of the base for receiving a first end of the optical fiber, plurality of turnings for receiving the optical fiber wrapped therearound;

center; and second opening in the center of the spiral for receiving a second end of the optical fiber, wherein the channel turnings have a cross section that is adapted to contain the optical fiber so that it does not spring out of the channel after it has been inserted.

In accordance with the invention there is provided, an optical fiber holding device comprising:

base with a first spiral channel in an upper surface thereof for receiving an optical fiber, the channel including:

first opening in the side of the base for receiving a first end of the optical fiber, plurality of turnings for receiving the optical fiber wrapped therearound; a center; and second opening in the center of the spiral for receiving a second end of the optical fiber, wherein the spiral channel forms an Archimedean spiral with an equal spacing between consecutive turnings.

BRIEF DESCRIPTION OF THE DRAWINGS

Exemplary embodiments of the invention will now be described in conjunction with the figures in which.

DETAILED DESCRIPTION

Figure 1:
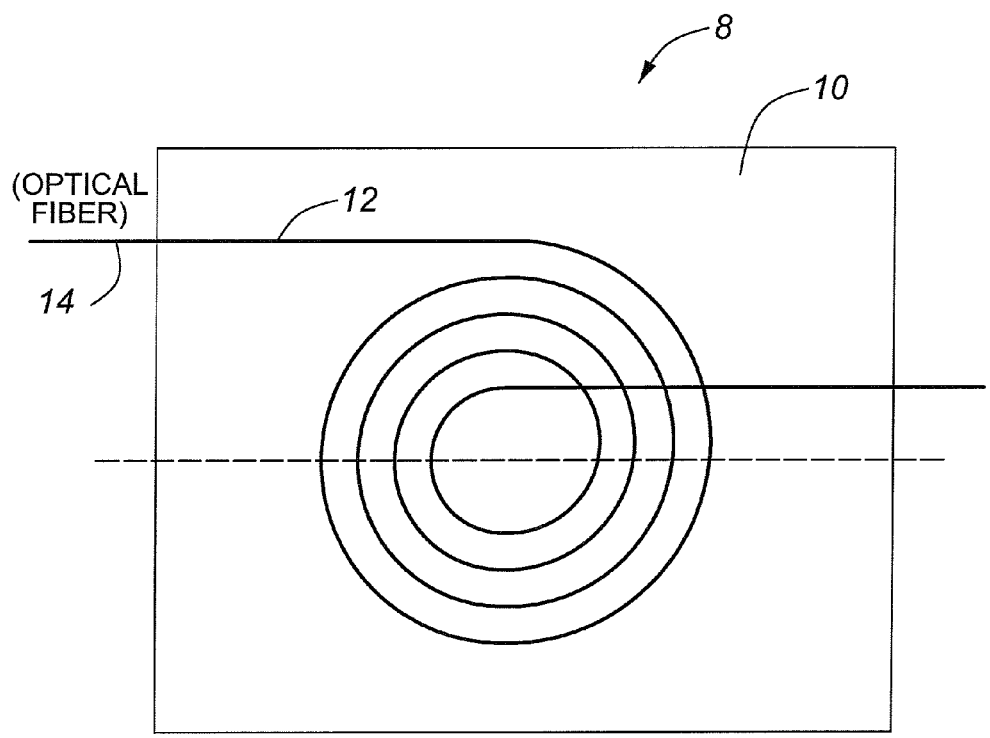
FIG. 1 is top view of a side loaded optical fiber holder in accordance with a first embodiment of this invention.
Figure 2:
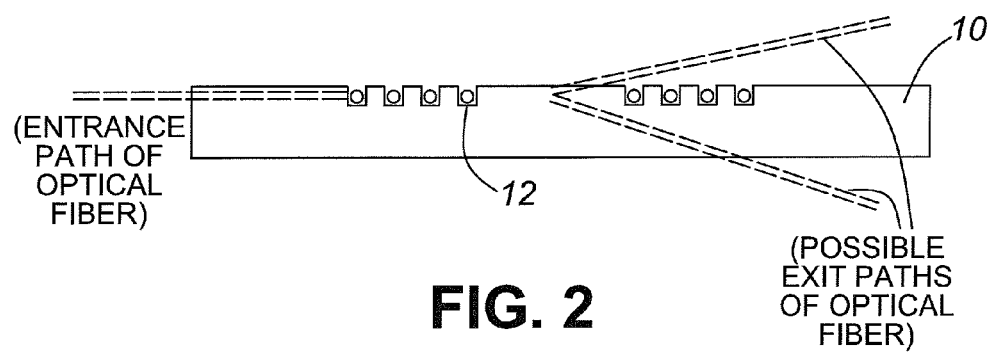
FIG. 2 is a cross sectional side view of the optical fiber holder shown in FIG. 1.

Referring now to FIG. 1 and FIG. 2, an optical fiber holder 8 is shown wherein a a side-loaded flat plate fixture 10 having a spiral channel 12 for holding a length of optical fiber 14 in a spiral pattern. The term "spiral" used within this specification is defined as curve on a plane that winds around a fixed center point at a continuously increasing or decreasing distance from the point.

As shown, the optical fiber 14 can enter a channel 12 in the top of the plate 10 from the left side. It spirals around inwards at least once, but typically multiple times as shown in FIG. 1, and ultimately exits from the inside of the spiral, where it is directed above or below the plane of the spiral in order to exit, which may be done, for example, by exiting the channel and passing through free space above the plate, or by entering a channel or hole that passes the fiber out toward the bottom side of the plate. In an alternative embodiment not shown the fiber can exit from an opening in the side of the plate just above or below the plane of the spiral. Typically the optical fiber 14 disposed within the holder 8 is bidirectional and may be oriented in either possible direction, that is, the fiber can equally well enter the channel from the inside of the spiral and then it can spiral outwards. Since the fiber is essentially all held in one plane and the plate can be relatively thin, the entire structure can have a very low volume and can simply be incorporated into a laser or amplifier unit.

The length of an fiber in a simple near-circular spiral fixture with a given pitch between adjacent turns of the spiral, and minimum and maximum radii of the spiral given by $r_{min}$ and $r_{max}$ respectively, is given by the following formula:

$$\text{Length} = \pi(r_{max}^2 - r_{min}^2)/\text{pitch}$$

whereby it can be calculated that with typical possible values of $r_{min}$=30 mm, $r_{max}$=100 mm, and a pitch of 1.5 mm, the length of fiber that can be placed in one fixture is 19.1 meters. Such a length is well matched to the required lengths of optical fiber for typical fiber laser and amplifier applications.

The plate can be manufactured in a straightforward manner out of many substances such as metal, ceramic, plastic, or composite. A metal such as aluminum is preferred since it has high thermal conductivity and can efficiently conduct heat away from the fiber. A ceramic such as aluminum nitride may also be a preferred material since it has not only fairly high thermal conductivity but also has a low coefficient of thermal expansion that is well matched to that of silica, which is typically the base material of optical fiber. Conventional fabrication processes can be utilized to machine the spiral channel into the plate. For optimal heat sinking, it is preferred that the surfaces of the channel and the plate should be very smooth and clean. In some embodiments it is also preferred the surfaces be substantially flat; the diameter of the fiber should be well controlled; and the optical fiber should preferably be coated with a compliant coating such as a polymer coating which will enable uniform contact with the fixture.

Figure 3A:
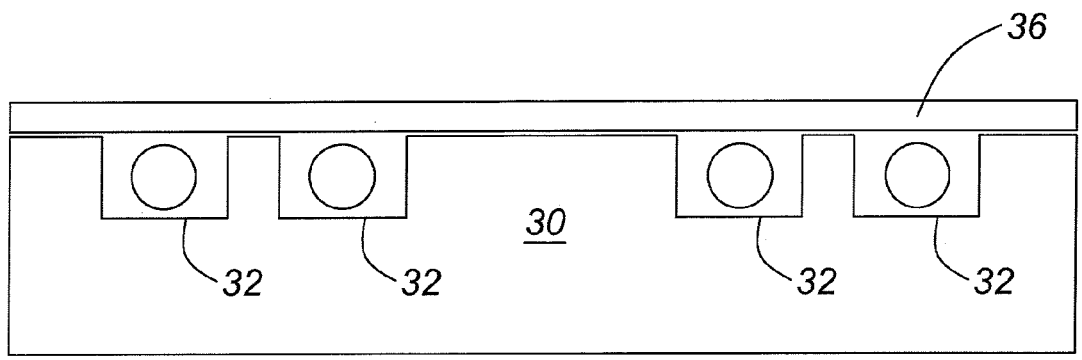
FIG. 3a is a cross sectional side view of an optical fiber holder in accordance with the invention wherein side walls of the groove are orthogonal to the flat base of the groove and having a lid for containing the optical fiber within the grooved channel.
Figure 3B:
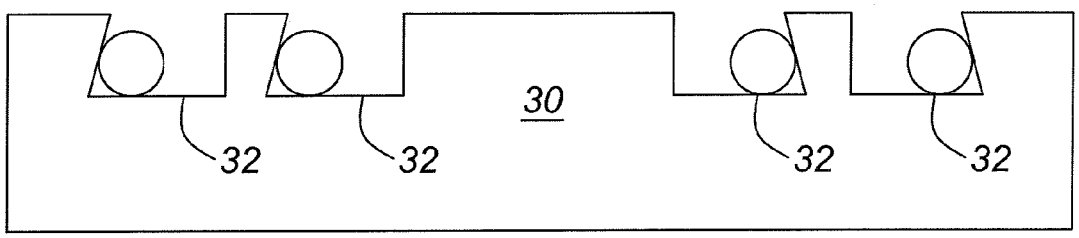
FIG. 3b is a cross sectional side view of an optical fiber holder in accordance with the invention wherein outer side walls of the groove or channel form an acute angle with respect to the to the flat base of the groove.
Figure 3C:
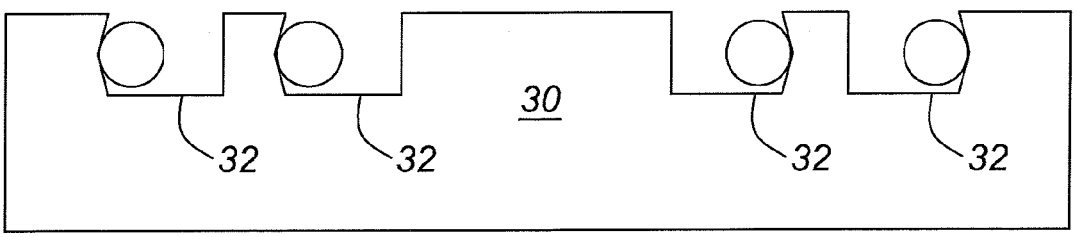
FIG. 3c is a cross sectional side view of an optical fiber holder in accordance with the invention wherein outer side walls of the groove first form an obtuse angle and subsequently form an acute angle with respect to the to the flat base of the groove providing a groove in the side wall in which the fiber is contained.

Several embodiments of the invention are illustrated in cross section in FIGS. 3a, 3b, and 3c. In the particular embodiment shown in FIG. 3a, a retaining plate 36 is attached to the top of the main plate 30 in order to ensure that the fiber does not accidentally come out of the channel 32. The plate 30 may be permanently affixed to the main plate 30 or preferably is removably coupled. The channel depth may be chosen so that the fiber protrudes slightly above the top surface of the main plate, so that the retaining plate physically contacts and squeezes the fiber, thus enabling improved heat sinking through both the bottom of the channel and the retaining plate. This is shown in FIG. 4a.

As is shown in FIGS. 3b and 3c the channel profile may be purposely shaped to retain the optical fiber placed within the channel. In these instances, the inherent springiness of the fiber is exploited to allow the fiber to press itself against the outermost wall of the channel, which is slanted or otherwise incut in order to help prevent the fiber from accidentally moving or coming out of the channel during handling. The action of the fiber pressing itself against the outer wall of the channel improves the heat sinking of the fiber through the outer wall, and in the case of the first picture, the fiber is also being pressed against the bottom surface of the channel and will benefit from the added heat sinking in that direction as well. FIG. 3b shown an embodiment that is particularly convenient for housing an optical fiber and for providing adequate heat sinking via the side wall. The channel has a grooved side wall which substantially conforms to the shape of the fiber, thereby increasing the contact area of the side wall and the fiber. Although it would likely increase cost of manufacturing, in a preferred embodiment the side wall would have a shape that truly conformed to the optical fiber against it. For typical round fibers, this would be a semicircular outer side wall cross-sectional shape with radius approximately equal to the radius of the fiber so that the fiber can be snuggly housed.

Figure 4A:
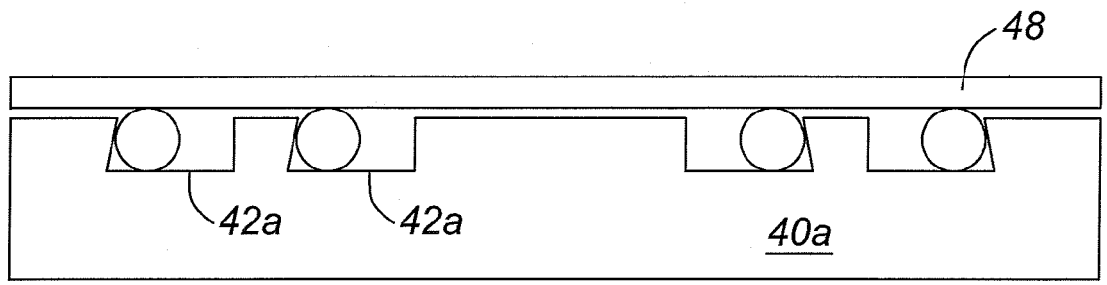
FIG. 4a is a cross sectional side view of an optical fiber holder wherein the fiber diameter is greater than the channel depth and wherein a lid is provided to contact and contain the optical fiber and to provide heat sinking of heat within the optical fiber into the lid and channel walls.

FIG. 4a shows a preferred embodiment of the invention wherein a shaped channel 42a within the main plate 40a is combined with a retaining plate 48. Here a channel depth is shown that ensures that the optical fiber 44 protrudes above the top surface of the main plate 40a, so that the retaining plate 48a physically contacts and squeezes the optical fiber 44, thus enabling improved heat sinking through at least three surfaces: the bottom of the channel 42, the retaining plate 48a, and the outermost wall of the channel 42a.

Figure 4B:
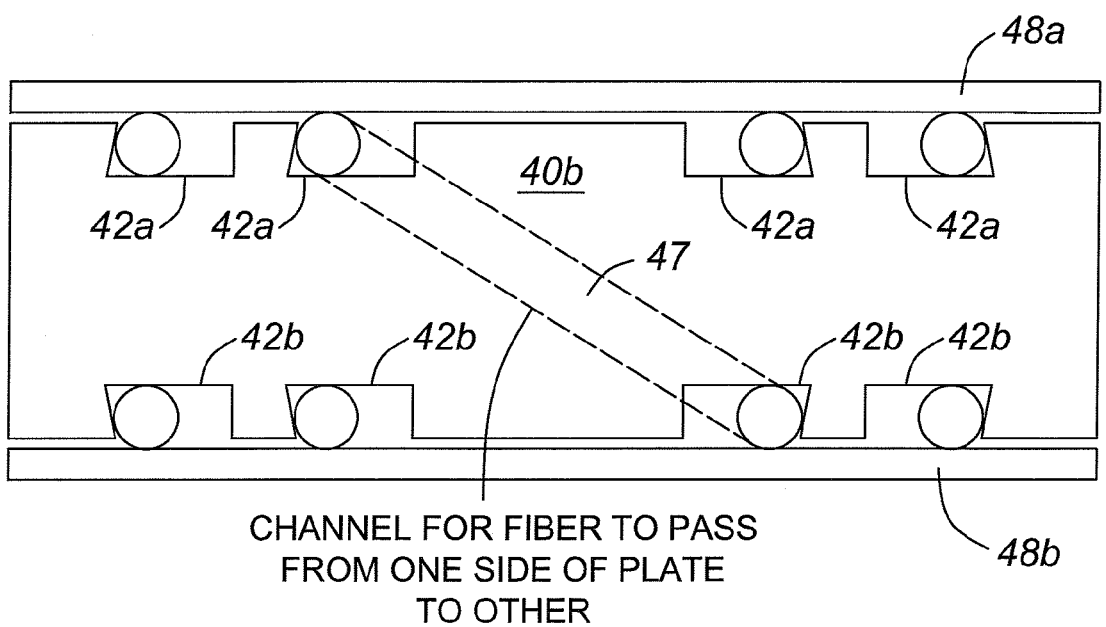
FIG. 4b is a cross sectional view of an optical fiber holder similar to FIG. 4a wherein both sides of the plate have a channel for holding the optical fiber and wherein the two channels have an internal groove or hole coupling them and for allowing an optical fiber to be wound on one side and to be threaded through to the other side for winding on the second side.

In FIG. 4b a main plate 40b is shown having spiral-shaped channels 42a and 42b on both sides. This device can hold twice as much optical fiber as a fixture with a channel on only one side shown in FIG. 4a. The optical fiber on one side of the fixture within channel 42a can be passed to the other side to the channel 42b through, for example, a channel 47 or hole through the plate, as shown, or by any other suitable path. Conveniently, a bottom retaining plate 48b is also provided.

As can be seen in FIGS. 3b, 3c, 4a, and 4b, the channel is shaped to retain the fiber. This provides a significant advantage in terms of ease of use when loading the fiber into the fixture. The fiber in high-power fiber lasers is quite large and stiff, and it can spring out instantaneously during loading if there is no positive reinforcement that keeps it tightly in the channel. One aspect of this invention is using that stiffness of the fiber to ensure that it locks itself in place as it is loaded. The tight locking action is also valuable in ensuring good thermal contact and heat sinking, which is very important for high power fiber lasers.

What is claimed is:

1. An optical fiber holding device for holding an optical fiber having a diameter and a stiffness, the optical fiber holding device comprising:
    a base plate with a first spiral channel in an upper surface thereof for holding and housing the optical fiber, the first spiral channel having:
        a first location for the optical fiber to enter the first spiral channel;
        a plurality of turnings around the first location, for holding the optical fiber;
        a second location for the optical fiber to exit the first spiral channel, and
        an inner sidewall and an outer sidewall separated by a first channel width;
    wherein the outer sidewall of the first spiral channel has a first slanted section for self-locking the optical fiber in the first spiral channel, when the optical fiber presses against the first slanted section of the outer sidewall of the first spiral channel, due to the stiffness of the optical fiber;
    wherein the first channel width is larger than the optical fiber diameter, for ease of loading the optical fiber into the first spiral channel; and
    wherein a minimal radius of curvature of the first spiral channel is at least 2 cm.

2. An optical fiber holding device having an optical fiber held therein, comprising:
    a base with a first spiral channel in an upper surface thereof holding and housing the optical fiber, the channel including:
        a first location where the fiber enters the channel;
        a plurality of turnings for holding the optical fiber wrapped therearound; and
        a second location where the fiber exits the channel wherein the bend radius of the optical fiber housed within the spiral channel is at least 2 cm,
    wherein the channel turnings have a cross section that is adapted to contain the optical fiber so that it does not spring out of the channel after it has been inserted,
    wherein the channel cross section has a side wall that is at least partially inwardly slanted for retaining the optical fiber so that the optical fiber does not spring out of the channel after it has been inserted,
    wherein the other side wall is not slanted and forms a right angle with respect to the flat bottom, and
    wherein the inward slanted sidewall is further from a centre of the spiral than the other sidewall adjacent thereto.

3. An optical fiber holding device having an optical fiber held therein, comprising:
    a base with a first spiral channel in an upper surface thereof holding and housing the optical fiber, the channel including:
        a first location where the fiber enters the channel;
        a plurality of turnings for holding the optical fiber wrapped therearound; and
        a second location where the fiber exits the channel wherein the bend radius of the optical fiber housed within the spiral channel is at least 2 cm,
    wherein an outer sidewall of the first spiral channel forms an acute angle with respect to the base,
    wherein the optical fiber holding device further comprises a cover for covering the first spiral channel and containing the optical fiber within the base so that the optical fiber does not spring out, and
    wherein the diameter of the optical fiber is greater than a depth of the first spiral channel, so that the optical fiber makes contact with the cover when the cover is placed on the base, thereby allowing heat to dissipate from the fiber to the base and to the cover.

4. An optical fiber holding device having an optical fiber held therein, comprising:
    a base with a first spiral channel in an upper surface thereof holding and housing the optical fiber, the channel including:
        a first location where the fiber enters the channel;
        a plurality of turnings for holding the optical fiber wrapped therearound; and
        a second location where the fiber exits the channel wherein the bend radius of the optical fiber housed within the spiral channel is at least 2 cm,
    wherein the optical fiber device has a second spiral channel in a lower surface of the base holding the optical fiber, the second channel including:

a first opening in the lower surface of the base for holding the optical fiber,
a plurality of turnings for holding the optical fiber wrapped therearound;
a center; and
a second opening in the center of the spiral for holding a second end of the optical fiber.

5. An optical fiber holding device having an optical fiber held therein, comprising:
a base with a first spiral channel in an upper surface thereof holding and housing the optical fiber, the channel including:
a first location where the fiber enters the channel;
a plurality of turnings for holding the optical fiber wrapped therearound; and
a second location where the fiber exits the channel wherein the bend radius of the optical fiber housed within the spiral channel is at least 2 cm,
wherein the optical fiber device has a second spiral channel in a lower surface of the base, holding a second different optical fiber, the second channel including:
a first opening in the lower surface of the base for holding the second different optical fiber,
a plurality of turnings for holding the second different optical fiber wrapped therearound;
a center; and
a second opening in the center of the spiral for holding a second end of the second different optical fiber.

6. An optical fiber holding device as defined in claim 3, further comprising a first lid covering the upper surface of the base, and a second lid covering the lower surface of the base.

7. An optical fiber holding device as defined in claim 4, further comprising a first lid covering the upper surface of the base, and a second lid covering the lower surface of the base.

8. An optical fiber holding device having an optical fiber held therein, comprising:
a base with a first spiral channel in an upper surface thereof holding and housing the optical fiber, the channel including:
a first location where the fiber enters the channel;
a plurality of turnings for holding the optical fiber wrapped therearound; and
a second location where the fiber exits the channel wherein the bend radius of the optical fiber housed within the spiral channel is at least 2 cm,
wherein a side wall of the channel includes a section at an acute angle to the base of the channel for frictionally engaging the optical fiber therebetween to increase thermal contact therebetween, and
wherein the side wall also includes a section at an obtuse angle to the base of the channel for engaging the optical fiber to increase thermal contact.

9. An optical fiber holding device having an optical fiber held therein, comprising:
a base with a first spiral channel in an upper surface thereof holding and housing the optical fiber, the channel including:
a first location where the fiber enters the channel;
a plurality of turnings for holding the optical fiber wrapped therearound; and
a second location where the fiber exits the channel wherein the bend radius of the optical fiber housed within the spiral channel is at least 2 cm,
wherein a side wall of the channel includes two sections with an obtuse angle therebetween to ensure the optical fiber contacts both sections.

10. An optical fiber holding device having an optical fiber held therein, comprising:
a base with a first spiral channel in an upper surface thereof holding and housing the optical fiber, the channel including:
a first location where the fiber enters the channel;
a plurality of turnings for holding the optical fiber wrapped therearound; and
a second location where the fiber exits the channel wherein the bend radius of the optical fiber housed within the spiral channel is at least 2 cm,
wherein a cross section of an outer wall of the channel is semi-circular and sized to conform to and tightly accommodate the shape of the optical fiber.

11. An optical fiber holding device of claim 1, wherein the outer sidewall has a rounded cross section sized and is shaped to conform to and tightly accommodate the optical fiber pressing against the outer sidewall, due to the stiffness of the optical fiber.

12. An optical fiber holding device of claim 1, wherein the outer sidewall has a second slanted section to allow the optical fiber to self-lock in the first spiral channel by pressing against the second slanted section of the outer sidewall, due to the stiffness of the optical fiber.

13. An optical fiber holding device of claim 1, wherein the first spiral channel has a bottom to allow the optical fiber to self-lock by pressing itself against the bottom of the first spiral channel, due to the stiffness of the optical fiber.

14. An optical fiber holding device of claim 13,
wherein the first spiral channel has a depth from the channel bottom to the upper surface of the base plate, wherein the channel depth is smaller than the optical fiber diameter, and
wherein the optical fiber holding device further comprises a retaining plate having a flat section for additionally locking the optical fiber by forming a contact between the optical fiber and the flat section, so as to additionally press the optical fiber against the bottom of the first spiral channel.

15. An optical fiber holding device of claim 14, wherein the retaining plate is removably coupled to the base plate.

16. An optical fiber holding device of claim 1, wherein the base plate is made of a single material.

17. An optical fiber holding device of claim 16, wherein the base plate material is selected from a group consisting of metal, ceramic, and composite.

18. An optical fiber holding device of claim 16, wherein the first spiral channel is machined in the base plate.

19. An optical fiber spool comprising an optical fiber holding device of claim 1 and the optical fiber locked therein, wherein the stiffness of the optical fiber is sufficient for frictionally engaging the optical fiber in the optical fiber holding device, whereby thermal conductivity therebetween is increased.

20. An optical fiber holding device of claim 1, further comprising a second spiral channel in a lower surface of the base plate, disposed opposite to the upper surface of the base plate, for holding and housing the optical fiber, the second spiral channel having:
a third location for the optical fiber to enter the second spiral channel;
a plurality of turnings around the third location, for holding the optical fiber;
a fourth location for the optical fiber to exit the second spiral channel, and
an inner sidewall and an outer sidewall separated by a second channel width;

wherein the outer sidewall of the second spiral channel has a slanted section for self-locking the optical fiber in the second spiral channel, when the optical fiber presses against the slanted section of the outer sidewall of the second spiral channel, due to the stiffness of the optical fiber;

wherein the second channel width is larger than the optical fiber diameter, for ease of loading the optical fiber into the second spiral channel; and wherein a minimal radius of curvature of the second spiral channel is at least 2 cm.

21. An optical fiber spool comprising an optical fiber holding device of claim 20 and the optical fiber locked therein, wherein the stiffness of the optical fiber is sufficient for frictionally engaging the optical fiber in the optical fiber holding device, whereby thermal conductivity therebetween is increased.

* * * * *